J. F. BARD.
POWER MECHANISM.
APPLICATION FILED NOV. 2, 1905.

976,115.

Patented Nov. 15, 1910.

Witnesses
L. H. Sager.
Geo. N. Kerr.

James F. Bard   Inventor
By his Attorney
C. N. Edwards

UNITED STATES PATENT OFFICE.

JAMES FRAZIER BARD, OF ERIE, PENNSYLVANIA, ASSIGNOR, BY MESNE ASSIGN.
MENTS, TO BURKE ELECTRIC COMPANY, A CORPORATION OF PENNSYLVANIA.

POWER MECHANISM.

976,115.  Specification of Letters Patent.  Patented Nov. 15, 1910.

Application filed November 2, 1905. Serial No. 285,545

*To all whom it may concern:*

Be it known that I, JAMES FRAZIER BARD, a citizen of the United States, residing at Erie, in the county of Erie and State of Pennsylvania, have invented certain new and useful Improvements in Power Mechanism, of which the following is a full, clear, and exact specification.

My invention relates to the transmission of power from one wheel or shaft to another by means of a belt, link, or rope drive, or a gearing of similar character, and is particularly applicable where an increased frictional contact is desired between the belt and the driving or driven gear.

The excessive slipping of a belt occurs, particularly in cases where there is considerable difference in the diameters of the driving and driven gear wheels or pulleys, where the speed is comparatively high as in cases where an electric motor is used, or where the distance between the driving and driven shafts is small. A common means of increasing the frictional contact is to utilize one or more idler pulleys so as to increase the amount of peripheral contact and consequently the driving power. In practicing my invention, I employ idlers for this purpose, and the essential objects are to produce a construction which will be universally applicable to any desired conditions as regards the direction of movement of the belt, the relative location of the driving and driven wheels, and an automatic compensation for any slack or changes in length or direction of the belt. These and other objects are secured by my invention.

Figure 1:
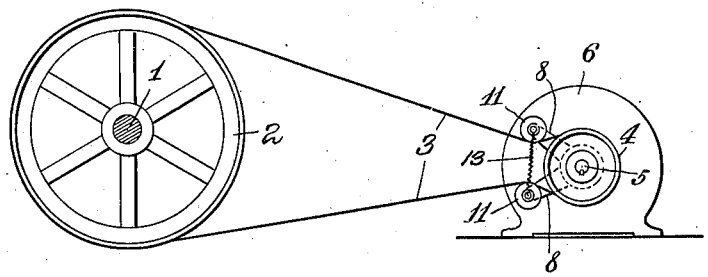
Figure 2:
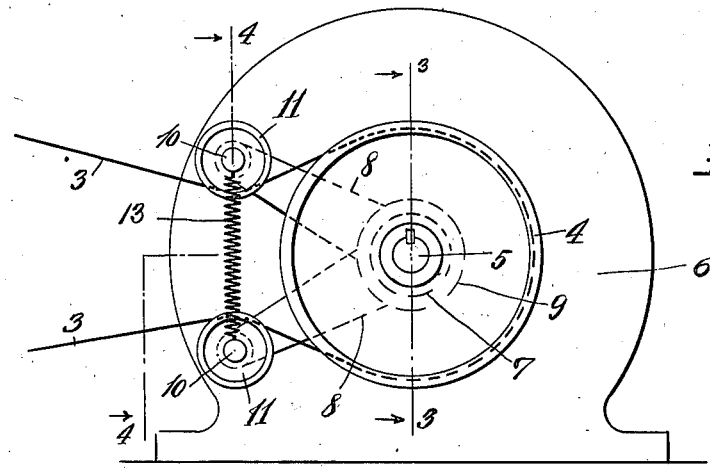
Figure 3:
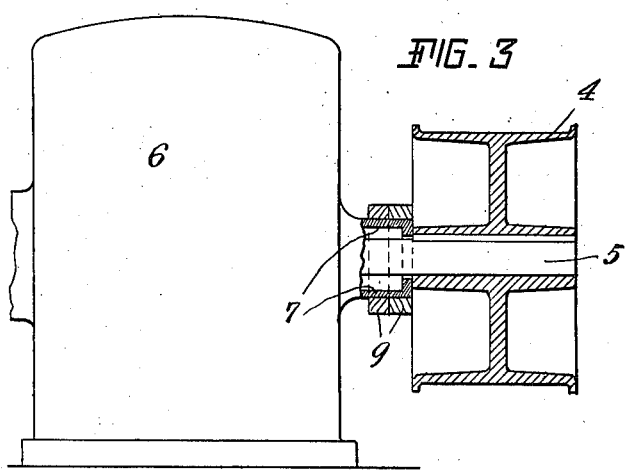
Figure 4:
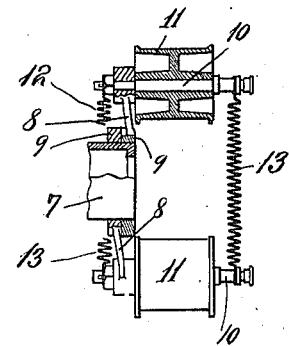

One application thereof will be understood from the following description and accompanying drawings, in which;

Figure 1 is a side view showing the general arrangement of the apparatus; Fig. 2 is an enlarged side view of my improved device; Fig. 3 is an end view and a part section on line 3—3 of Fig. 2; and Fig. 4 is a part sectional and part elevation on line 4—4 of Fig. 2.

Referring to Fig. 1, there is indicated a shaft 1 having a wheel or pulley 2 engaged by a belt 3. The belt passes around a second wheel or pulley 4 fixed to its shaft 5. Either shaft 1 or 5 may be the driving or driven shaft. In this instance there is indicated in outline an electric motor or dynamo 6 of which the shaft 5 is a part.

From the shaft 5, or from the frame or support 7 concentric therewith, extend two arms 8, 8 which are pivoted and adapted to swing independently of each other about the axis of shaft 5. Each arm has an end portion 9 which encircles the support 7 and so permits movement of the arms as desired. The other end of each arm carries a spindle 10, upon which the idler 11 is freely movable. The arms or the two spindles are connected together so that they are kept within a certain relation to each other. The connection is preferably yieldable and is shown as a spring 12 connecting the outer ends of the arms 8, 8 and there is also shown in this instance a second and similar spring 13 connecting the ends of the spindles 10. It will be understood that the length of the springs 12, 13 or the supports for their ends may be made adjustable in any of the well known ways.

In the use of my invention, it will be seen that a large peripheral contact of the belt and pulley 4 is obtained with a consequent increase in the driving power. It is also apparent that in installing the apparatus, the position of the arms and idlers will automatically adjust themselves to any position desired about the shaft, thus doing away with all devices for clamping to the frames or other means for holding the idlers in place. Also the yieldable connection of the arms will automatically compensate for and take up slack in the belt or for variations in the length or direction of travel of the belt.

While I have shown and described one embodiment of my invention, it is evident that I am limited in the scope thereof only as indicated by the following claim. It is also understood that my invention may be applied to either the driving or driven part, or to both if desired.

Having thus described my invention, I declare that what I claim as new and desire to secure by Letters Patent, is,—

The combination of a driving element, a driven element, a belt connecting said elements, two idlers, means for pivotally supporting said idlers about the axis of one of said elements, and a spring on each side of said belt located between said idlers for drawing the idlers toward each other.

In testimony whereof I affix my signature, in presence of two witnesses.

JAMES FRAZIER BARD.

Witnesses:
G. IRVING BLAKE,
EDYTHE L. ZEEB.